United States Patent [19]
Kondo

[11] Patent Number: 4,910,594
[45] Date of Patent: Mar. 20, 1990

[54] METHOD AND APPARATUS FOR ADAPTIVELY COMPRESSING A VIDEO SIGNAL IN ACCORDANCE WITH THE VALVES OF INDIVIDUAL PIXELS

[75] Inventor: Tetsujiro Kondo, Kanagawa, Japan
[73] Assignee: Sony Corporation, Tokyo, Japan
[21] Appl. No.: 234,326
[22] Filed: Aug. 18, 1988

[30] Foreign Application Priority Data

Aug. 22, 1987 [JP] Japan ................... 62-208957

[51] Int. Cl.$^4$ ............................................. H04N 7/12
[52] U.S. Cl. ..................................... 358/138; 358/133
[58] Field of Search ............... 358/138, 133, 135, 136, 358/260; 382/56; 375/122

[56] References Cited

U.S. PATENT DOCUMENTS

| 4,144,543 | 3/1979 | Kaga | 358/138 X |
| 4,782,387 | 11/1988 | Sabri et al. | 358/138 X |

FOREIGN PATENT DOCUMENTS

| 2320017 | 2/1977 | France . |
| 1537738 | 9/1977 | United Kingdom . |
| 2083982 | 3/1982 | United Kingdom . |

*Primary Examiner*—James J. Groody
*Assistant Examiner*—Victor R. Kostak
*Attorney, Agent, or Firm*—Philip M. Shaw, Jr.

[57] ABSTRACT

On a transmitting side, a digital video signal comprising respective pixel samples (each of which may include eight bits) is received, and a set of elementary pixel samples determined from the received pixel samples at a predetermined rate are transmitted. The values of respective subject pixel samples other than the elementary ones are predicted, and respective predictive errors of the predicted values are detected from present values of the received pixel samples. First flags are then generated individually for each subject pixel sample whose predictive error is greater than a threshold value, and second flags are generated individually for each subject pixel sample whose predictive error is less than or equal to the threshold value. The present values of the subject pixel samples having the first flags are transmitted, and compressed data (including the second flags) is transmitted for the subject pixel samples having the second flags. On a receiving side, values of the subject pixel samples represented by the compressed data with the second flags are predicted, and the subject pixels are interpolated with pixel samples having a present value equal to the predicted value. A decoded video signal, including the transmitted elementary pixel samples, the respective subject pixel samples having the first flags, and the respective interpolated subject pixel samples, is then outputted.

4 Claims, 8 Drawing Sheets

◎ × □ × ◎ × □ × ◎
a1  b1  c1  d1  e1

△ × △ × △ × △ × △
a2  b2  c2  d2  e2

○ × □ × ○ × □ × ○
a3  b3  c3  d3  e3

△ × △ × △ × △ × △
a4  b4  c4  d4  e4

◎ × □ × ◎ × □ × ◎
a5  b5  c5  d5  e5

△ × △ × △ × △ × △

○ × □ × ○ × □ × ○

△ × △ × △ × △ × △

◎ × □ × ◎ × □ × ◎

METHOD AND APPARATUS FOR ADAPTIVELY COMPRESSING A VIDEO SIGNAL IN ACCORDANCE WITH THE VALVES OF INDIVIDUAL PIXELS

FIELD OF THE INVENTION:

The present invention relates to a video signal compressive encoding/decoding method and an apparatus for carrying out such method, and more particularly to an improved method and apparatus for encoding and decoding a video signal compressed adaptively in accordance with the values of individual pixels.

BACKGROUND OF THE INVENTION

In transmission of a video signal, it is conventional to compress the amount of transmission data in comparison with the amount of original data. An exemplary conventional method for such performing such compression is a subsampling technique which reduces a sampling frequency by thinning out the individual pixel samples of a digitized original video signal at predetermined intervals. More specifically, as disclosed in Japanese Patent Laid-open No. 57 (1982)-78290, the individual pixel samples of the video signal are so thinned out that the sampling rate is reduced by one-half, and the data of the non-thinned pixel samples are transmitted while a flag indicating the position of the non-thinned sample to be used for interpolation on the receiving side is also transmitted with regard to the thinned sample.

One problem with such a conventional subsampling process in which the subsampling pattern is not changed, is that, in the contour or the like of a subject image including high frequency components, the reproduced image exhibits conspicuous quality deterioration. Particularly when the subsampling rate is lowered, such image quality deterioration is extremely great.

For the purpose of solving the problems mentioned, the present applicant previously proposed an improved method which divides the image of one frame into a plurality of segmental blocks then selects a suitable one out of a plurality of prepared sampling patterns, and transmits, together with the pixel sample to be transmitted, an identification code representing the selected sampling pattern.

However, in this method, the number of kinds of prepared sampling patterns must be limited for suppressing the redundancy derived from the identification code, and consequently the method is not suitable for processing every image. Moreover this method has the disadvantage that the segmentation operation may bring about block distortion.

OBJECTS AND SUMMARY OF THE INVENTION

It is therefore an object of the present invention to provide a video signal compressive encoding/decoding method which is capable of solving the known problems mentioned, and also an apparatus for carrying out such method.

In particular, a principal object of the present invention resides in providing an improved video signal compressive encoding/decoding method and apparatus which minimizes the quality deterioration of the reproduced image.

Another object of the invention is to provide a video signal compressive encoding/decoding method and apparatus adapted to diminish the quality deterioration of an image reproduced on a block basis.

A further object of the invention is to provide a video signal compressive encoding/decoding method and apparatus capable of accomplishing a real-time process adequate for a motion image.

A further object of the invention resides in providing a video signal compressive encoding/decoding method and apparatus which can maintain substantially fixed the unitary amount of generated information to be processed.

Still another object of the invention is to provide a video signal compressive encoding/decoding method and apparatus requiring no large-capacity buffer memory.

Yet another object of the invention is to provide a video signal compressive encoding/decoding method and apparatus adapted to reduce the amount of generated information that may otherwise be increased by some noise component.

According to one aspect of the inventive video signal compressive encoding method and apparatus, a digital video signal represented by respective pixel samples is received, a set of elementary pixel samples having a predetermined period is determined from the pixel samples, values corresponding to those pixel samples other than the elementary pixel samples (referred to herein as "non-elementar" pixel samples, or "subject" pixel samples) are predicted, a predictive error for each predicted value is determined from the present values of the pixel samples, the respective predictive errors are compared with a threshold value, respective flags are generated when the respective predictive errors do not exceed the threshold value, and an encoded video signal including the following elements is transmitted: the elementary pixel samples, the present value of each non-elementary pixel sample whose predictive error is greater than the threshold value, and a compressed data (including at least one of the flags) signal for each non-elementary pixel sample whose predictive error is less than or equal to the threshold value.

Another aspect of the invention is a method and an apparatus for decoding the encoded video signal described above, which are adapted for receiving the transmitted elementary pixel samples, the transmitted non-elementary pixel sample present values, and the transmitted compressed data signals; determining an interpolated pixel sample value for each compressed data signal by an interpolation operation; and outputting a decoded video signal including the transmitted elementary pixel samples, the transmitted non-elementary pixel sample present values, and the interpolated pixel sample values.

DETAILED DESCRIPTION OF THE PREFERRED EMBODIMENTS

Hereinafter a video signal compressive encoding/decoding method of the present invention and an apparatus contrived for carrying out such method will be described in detail with reference to the accompanying drawings. First, the inventive video signal compressive encoding method will be described.

Figures 1, 2:
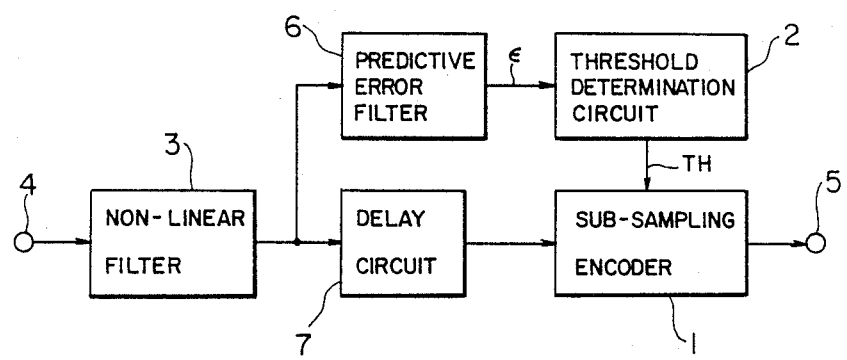
FIG. 1 schematically illustrates a video signal that may be processed in accord with the compressive encoding method of the present invention.
FIG. 2 is a schematic block diagram of an exemplary video signal compressive encoding apparatus embodying the present invention.

In FIG. 1, individual pixel samples existing in partial regions of one field of an input digital video signal are represented by symbols ⊙ o, □, Δ and x respectively, wherein the horizontal spacing between the pixel samples corresponds to the sampling period, and the vertical spacing corresponds to the line interval. Denoted by a sign o is an elementary pixel sample occurring in one out of every four lines, and in one out of every four pixels in each line in which it occurs. The elementary pixel samples thus included at a rate of 1 per 16 pixel samples are entirely transmitted without being thinned out.

Meanwhile the other ("non-elementary") pixel samples represented by signs o, □, Δ and x other than the elementary ones are adaptively thinned out. That is, in the following sequence, the value of each nonelementary pixel sample is compared with the predicted value thereof based on the value of its peripheral reference pixel sample, and when the predicted residue $\epsilon$ is smaller than a threshold value TH, the subject pixel sample is not transmitted ("thinned out") and instead an identification code indicating the thin-out of such subject pixel sample is transmitted. On the other hand, in case the predicted residue $\epsilon$ is in excess of the threshold value TH, the subject pixel sample is transmitted without being thinned out.

The threshold value TH is determined by taking into consideration the image quality deterioration that may be induced in the reproduced image during the decoding operation (to be described below) when the value of the thinned-out pixel sample is interpolated using one or more peripheral reference pixel samples associated with the thinned-out pixel sample.

For example, the value of the non-elementary pixel sample a3 denoted by o (in FIG. 1) is compared with the average value ½ (a1+a5) of two peripheral elementary pixel samples a1 and a5 at positions spaced apart by 2 lines upward and downward respectively in the same field. Similarly, the values of non-elementary pixel sample e3 is compared with the average value of two peripheral elementary pixel samples e1 and e5.

The value of the pixel sample c1 denoted by □ is compared with the average value ½ (a1+e1) of two peripheral pixel samples a1 and e1 at positions spaced apart by two pixel samples leftward and rightward on the same line. Similarly, the values of subject pixel samples c3 and c5 are compared with the average values of peripheral pixel samples a3 and e3, and a5 and e5, respectively.

The value of a pixel sample 2 denoted by Δ is compared with the average value ½ (a1+a3) of two peripheral pixel samples a1 and a3 at positions spaced apart by one line upward and downward respectively in the same field. Similarly, the values of subject pixel samples c2, e2, a4, c4 and e4 are compared with the average values of peripheral pixel samples c1 and c3, e1 and e3, a3 and a5, c3 and c5, and e3 and e5, respectively.

The value of the pixel sample b1 denoted by x is compared with the average value ½ (a1+c1) of two peripheral pixel samples a1 and c1 at positions spaced apart by one pixel sample leftward and rightward respectively on the same line. Similarly, the values of subject pixel samples b2, b3, b4, b5, d1, d2, d3, d4 and d5 are compared with the average values of peripheral pixel samples a2 and c2, a3 and c3, a4 and c4, a5 and c5, c1 and e1, c2 and e2, c3 and e3, c4 and e4, and c5 and e5, respectively.

When the pixel samples are adaptively thinned out as mentioned above, the amount of output data depends upon the content of the image. Accordingly, if the video signal thus processed by compressive encoding is recorded and reproduced by means of a tape recorder or the like, there occurs a variation in the amount of data per track. On the other hand, if the data rate is maintained constant in a recording mode, the unitary length is changed as a result to consequently emplicate the editing and so forth.

For the purpose of eliminating the disadvantage described in the preceding paragraph, buffering is carried out to maintain constant the amount of data recorded per track. In such embodiment of the compressive encoding method, the number of pixel samples to be thinned out is changed by varying the threshold value TH of subsampling encoder 1 (shown in FIG. 2) in accordance with the content of the video signal per field.

That is, the number of pixel samples thinned out becomes greater if the threshold value TH is increased, consequently reducing the amount of transmitted information. On the contrary, the number of pixel samples thinned out becomes smaller if the threshold value TH is decreased, consequently increasing the amount of transmitted information. Therefore buffering is accomplished by controlling the threshold value TH.

As shown in FIG. 2, the video signal compressive encoding apparatus of the present invention consists fundamentally of a subsampling encoder 1. So that the threshold value TH received by subsampling encoder 1 is adaptively changed in accordance with the content of the input image, there is provided a threshold determination circuit 2. To prevent failure to attain a desired compression rate due to some noise component included in the input video signal, nonlinear filter 3 is provided for removing such noise component Accordingly, the compressive encoding apparatus comprises, as shown in FIG. 1: an input terminal 4 supplied with a digital video signal where each pixel sample is quantized with 8 bits at a sampling frequency of 13.5 MHz; a nonlinear filter 3 connected to the input terminal 4; a subsampling encoder 1 supplied with the filtered digital video signal from which the noise has already been removed in nonlinear filter 3; an output terminal 5 at which the compressed video signal encoded by the subsampling encoder 1 is obtained; a predictive error filter 6 constituted partially in the same manner as the subsampling encoder 1 and supplied with the noise-removed digital video signal from the nonlinear filter 3; a threshold determination circuit 2 for deciding the threshold value TH of the subsampling encoder 1 adaptively in accordance with the predictive error $\epsilon$ outputted from the predictive error filter 6; and a delay circuit 7 inserted between the nonlinear filter 3 and the subsampling encoder 1. Circuit 7 includes a field memory and so forth to compensate for the processing times of predictive error filter 6 and threshold determination circuit 2.

In case the threshold value TH of the subsampling encoder 1 need not be changed adaptively, the predictive error filter 6, threshold determination circuit 2, and delay circuit 7 may be omitted from the FIG. 2 apparatus.

Next, the specific constitution of the individual circuit blocks in the FIG. 2 embodiment of the video signal compressive encoding apparatus will be described in sequence. First, subsampling encoder 1 will be described with reference to FIG. 3.

Figure 3:
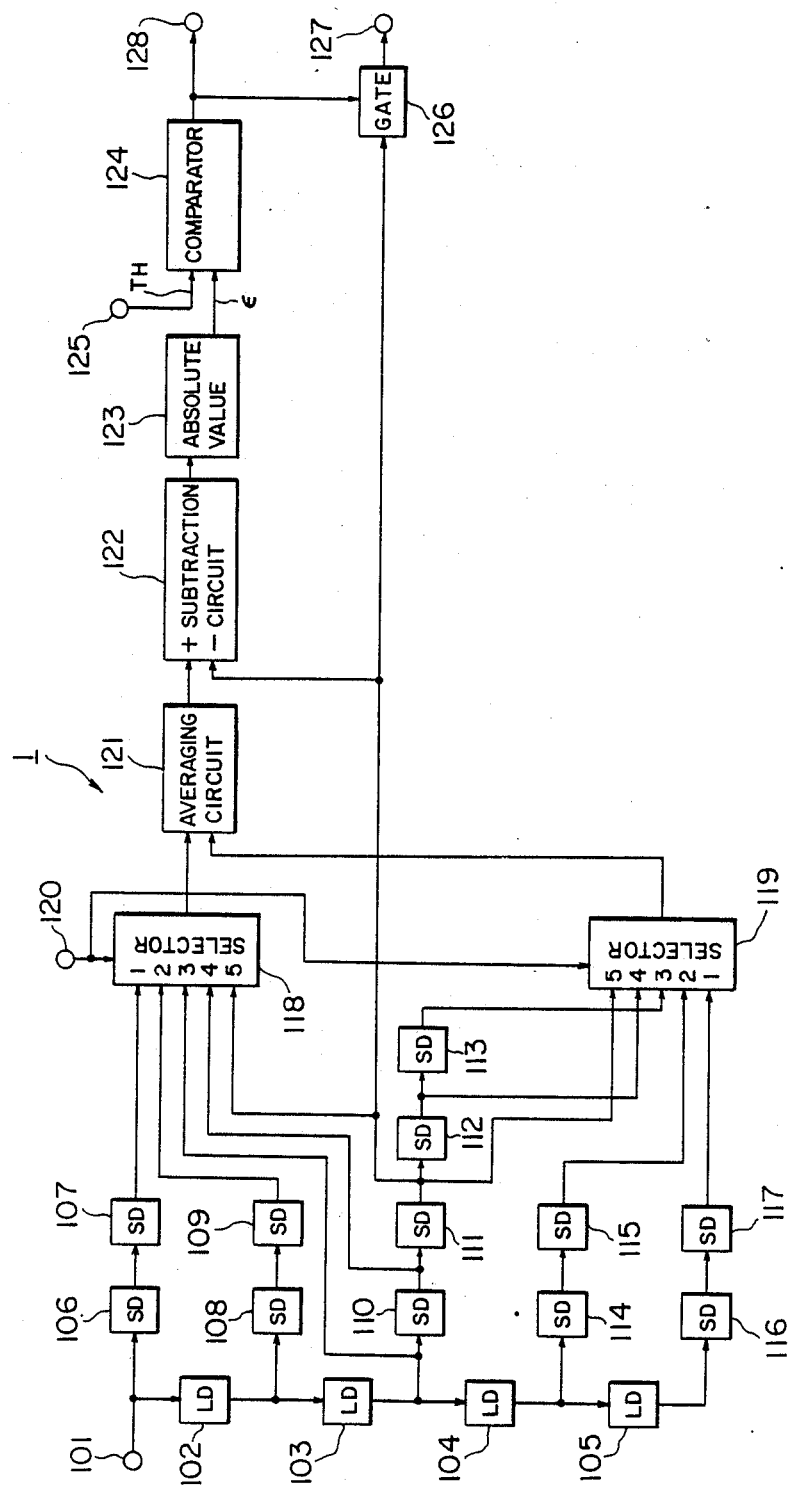
FIG. 3 is a block diagram of an exemplary subsampling encoder employed in the video signal compressive encoding apparatus of the invention.

In FIG. 3, a digital video signal is fed via the delay circuit 7 to an input terminal 101 of the subsampling encoder 1. The terminal 101 is connected to line delay ("LD") circuits 102, 103, 104 and 105 in a cascade connection. Sample delay ("SD") circuits 106 and 107 are also connected in series to input terminal 101. Sample delay circuits 108 and 109 are connected in series to the output side of line delay circuit 102, and sample delay circuits 110, 111, 112 and 113 are connected in series to the output side of line delay circuit 103. Sample delay circuits 114 and 115 are connected in series to the output side of line delay circuit 104, and sample delay circuits 116 and 117 are connected in series to the output side of line delay circuit 105. Each of such line delay circuits 102, 103, 104 and 105 has a delay time corresponding to one horizontal scanning interval, and each of the sampling delay circuits 106 through 117 has a delay time corresponding to one sampling interval. The sample data of a plurality of pixels included in a predetermined two-dimensional area of the television image can be extracted simultaneously by a combination of the line delay circuits 102 through 105 and the sample delay circuits 106 through 117.

The output side of tee sample delay circuit 111 corresponds to the subject pixel sample out of those extracted simultaneously.

Each of selectors 118 and 119 has five input terminals and, in response to a selection signal received from a terminal 120 synchronously with a sampling clock pulse, selectively provides at its output terminal one of the input data fed to such five input terminals respectively.

Although no detailed explanation is necessary with regard to this stage, it will be appreciated that the selection signal should be generated so as to ensure execution of the below-mentioned selection operation in accordance with an adequate timing generator circuit.

The first input terminal of selector 118 is supplied with the output data of sample delay circuit 107, and the firs input terminal of selector 119 is supplied with the output data of sample delay circuit 117. Accordingly, in case the subject pixel sample is any one denoted by o, the input data supplied to the respective first input terminals of the selectors 118 and 119 are selected as peripheral reference pixel samples. The second input terminals of the selectors 118 and 119 are supplied, respectively, with the output data of the sample delay circuits 109 and 115. Accordingly, in case the subject pixel sample is any one denoted by $\Delta$, the input data supplied to the respective second input terminals of the selectors 118 and 119 are selected as peripheral reference pixel samples. The third input terminals of the selectors 118 and 119 are supplied with the output data of line delay circuit 103 and sample delay circuit 113. Accordingly, in case the subject pixel sample is any one denoted by $\square$, the input data supplied to the respective third input terminals of the selectors 118 and 119 are selected as reference pixel samples. The fourth input terminals of the selectors 118 and 119 are supplied with the output data of sample delay circuits 110 and 112. Accordingly, in case the subject pixel sample is any one denoted by x, the input data supplied to the respective fourth input terminals of the selectors 118 and 119 are selected as peripheral reference pixel samples. The fifth input terminals of the selectors 118 and 119 are supplied with the output data of sample delay circuit 111. In case the subject pixel sample is any one denoted by ⊙, both the selectors 118 and 119 select the elementary pixel sample directly.

The output data of the selectors 118 and 119 are supplied to averaging circuit 121, which generates a signal representing the average data of the two peripheral reference pixel samples selected individually by the selectors 118 and 119. Such average data, and the data of the subject pixel sample emerging from sample delay circuit 111, are both supplied to subtraction circuit 122. The residual data obtained from circuit 122 is supplied to absolute value circuit 123 so as to be converted into an absolute value. Subsequently the output data from the absolute value circuit 123 is supplied to comparator 124 in which it is compared with the threshold value obtained from the terminal 125.

The output data of the absolute value circuit 123 represents the predictive error $\epsilon$ generated when the value of the subject pixel sample is predicted from the average of the values of the two peripheral pixel samples as mentioned previously. If the predictive error $\epsilon$ is less than the threshold value TH, this signifies that the subject pixel sample may be thinned out. In this case, appropriate control data (which may comprise a single bit) indicating this status emerges from comparator 124 (i.e., the bit emerging from comparator 124 is a binary "1"). If the predictive error $\epsilon$ exceeds the threshold value TH, this signifies that adequate interpolation is impossible on the receiving side, so that th control data from the comparator 124 is turned to binary "0". The control data thus obtained serves to execute on/off control of gate circuit 126 which is supplied with the output data of the sample delay circuit 111. When the control data from circuit 124 is "0", the gate circuit 126 is turned on so that the original data of the subject pixel sample is supplied to output terminal 127. However, when the control data from circuit 124 is "1", the gate circuit 126 is turned off so that the original data of the subject pixel sample is not supplied to output terminal 127. The control data is also supplied to output terminal 128, from which terminal it may be transferred together with the subsampled data of the pixel sample. That is, the output terminals 127 and 128 of the subsampling encoder 1 may be connected to a framing circuit (not shown in FIG. 3), where the pixel example data and the control data are combined with each other. This combined signal (consisting of nine bits per pixel) is transmitted to output terminal 5 of FIG. 2 when the pixel sample is not thinned out; but when the pixel sample is thinned out, merely the control data (one bit per pixel) is transmitted to output terminal 5.

As described above, the subsampling is performed in accordance with whether the predictive error $\epsilon$ is greater than the threshold value or not in regard to each subject pixel sample. In other words, data transmission or thinning-out is controlled not on the basis of block but adaptively on the basis of each pixel sample, which is the minimum unit. In making a decision as to whether the thinning-out operation is performed or not in conformity with the predictive error $\epsilon$, the actual data is used in place of the interpolation data to consequently enable real-time processing without undesired repetition.

Predictive error filter 6 may be substantially the same as subsampling encoder 1 shown in FIG. 3. However, since filter 6's function is merely to generate the predictive error $\epsilon$ (corresponding to the output of absolute value circuit 123 in FIG. 3), filter 6 will differ from encoder 1 in that comparator 124 and gate circuit 126 will be omitted from filter 6.

Next, the constitution of threshold determination circuit 2 will be described with reference to FIG. 4.

Figure 4:
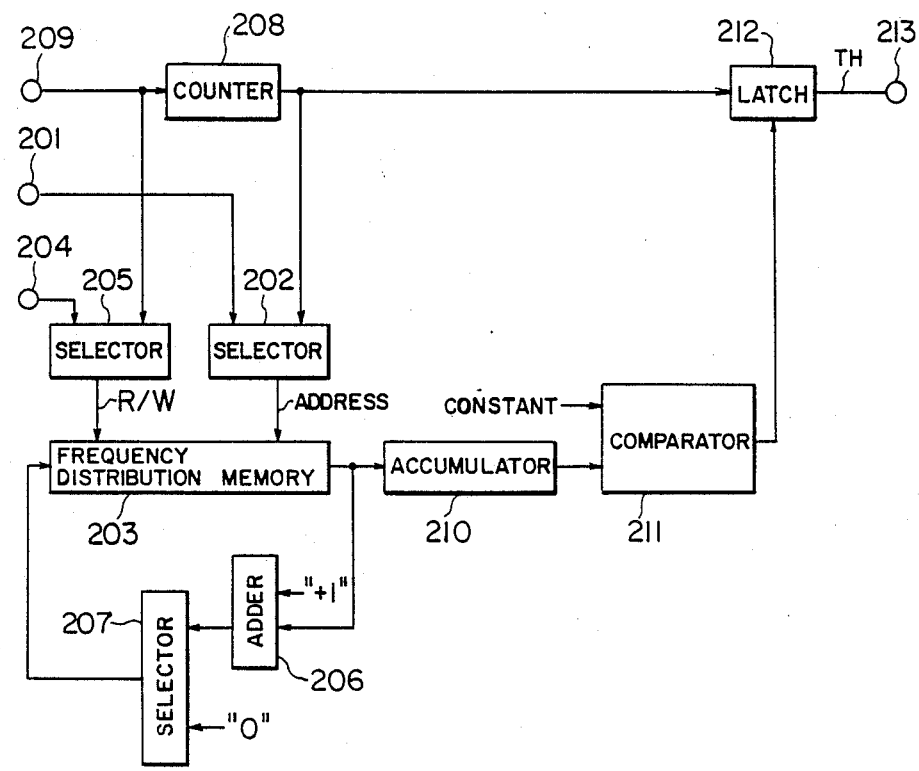
FIG. 4 is a block diagram of an exemplary threshold determination circuit employed in the subsampling encoder of the video signal compressive encoding apparatus of the invention.

In FIG. 4, an input terminal 201 is supplied with the predictive error $\epsilon$ obtained from the predictive error filter 6. The predictive error $\epsilon$, when composed of 8 bits, may take any value in the range from 0 through 255.

The predictive error $\epsilon$ is fed as an address signal to a frequency distribution memory 203 via a selector 202. Also a sampling clock from an input terminal 204 is fed as a write/read signal to the frequency distribution memory 203 via a selector 205. In response to the write/read signal the frequency distribution memory 203 performs its operation in a read-modified-write mode to write the data immediately after reading out with respect to the same address.

Frequency distribution memory 203 selectively receives, at its input terminal via a selector 207, either "0" or the value obtained by incrementing the output of the memory 203 by one in an adder 206.

To commence operation, frequency distribution memory 203 is initialized so that it's entire contents are set to zero. Then when the predictive error $\epsilon$ is fed to memory 203 as an address, the address data (zero in the initial state) is read out and fed to the adder 206, where the value is incremented and then is rewritten in the same address. Thus, when the predictive errors $\epsilon$ are fed during one field, the pixel sample frequencies for producing the individual predictive errors $\epsilon$ are stored in the addresses 0 to 255 of frequency distribution memory 203.

The threshold value TH is determined by using the frequency distribution table stored in the memory 203. The operation of determining the threshold value is executed within, for example, the vertical blanking interval. During such threshold determination, the contents of counter 208 is sequentially incremented from 0 to 255 in response to the clock signal from input terminal 209 and is then fed as an address to frequency distribution memory 203 via selector 202.

The clock signal from terminal 209 is fed as a read signal to memory 203 via selector 205. The numbers of pixel samples represented by the individual frequencies of the predictive errors $\epsilon$ stored in the frequency distribution memory 203 are read out and fed to an accumulator 210. Simultaneously the selector 207 selects zero data, which is then written in the frequency distribution memory 203 to initialize it for processing the next field.

Accumulator 210 sequentially accumulates the frequencies of the predictive errors $\epsilon$ from 0 toward 255. The output value of accumulator 210 is fed to comparator 211, which is supplied with the required number of thin-out pixel samples corresponding to the target rate, so that the output value of the accumulator 210 is compared with such required number. When the output value of accumulator 210 has exceeded the required number of thin-nut pixel samples, a latch pulse is generated from comparator 211.

The output signal of counter 208 incremented from 0 toward 255 is fed to latch circuit 212 and is thereby latched by the latch pulse generated from comparator 211. Consequently, the value latched in latch circuit 212 corresponds to the minimum of the predictive errors $\epsilon$ conforming with the required number of thin-out pixel samples. The value thus obtained is taken out from the output terminal 213 as the threshold value TH of the subsampling encoder 1.

Since the frequency of the predictive error 0 includes elementary pixels as well as non-elementary pixels, the required number of thin-out pixel samples is determined in consideration of such frequency.

Figure 6:
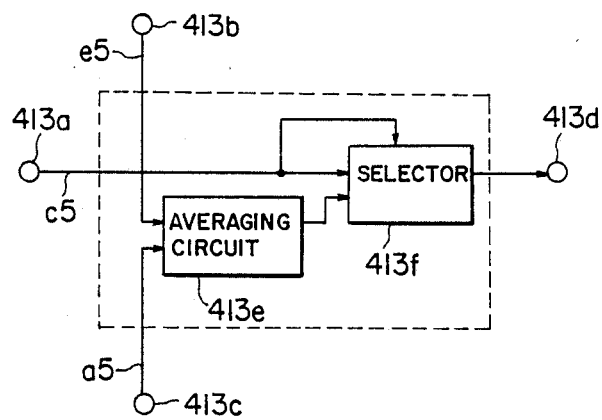
FIG. 6 is a block diagram of an exemplary interpolation circuit employed in the sampling decoder of FIG. 5.

Prior to giving a description of the nonlinear filter 3, the apparatus for decoding the compressed video signal will be explained with reference to FIGS. 5 and 6.

Figure 5:
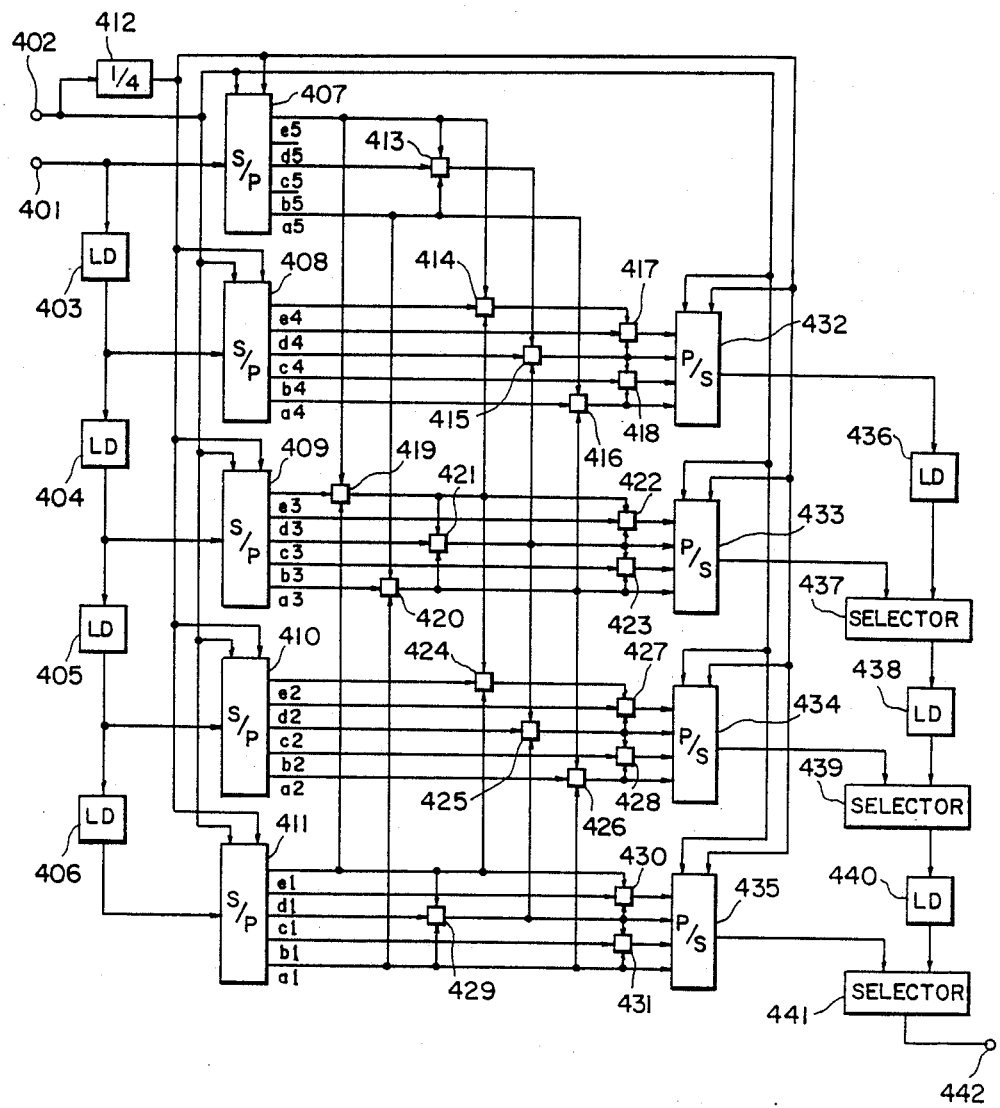
FIG. 5 is a block diagram of an exemplary decoder for a video signal compressively encoded by the subsampling encoder shown in FIG. 3.

FIG. 5 shows the circuit configuration of a subsampling decoder provided on the inventive system's receiving side (the reproducing side in a recording/reproducing apparatus). In FIG. 5, an input terminal 401 is supplied with the compressive-encoded digital video signal, while an input terminal 402 is supplied with a sampling clock signal synchronized with the received data.

The input terminal 401 is connected in series to line delay circuits 403, 404, 405 and 406. Serial-to-parallel converters 407, 408, 409, 410 and 411 are connected respectively to the input terminal 401 and the outputs of the line delay circuits 403, 404, 405, and 406. The data received from terminal 401 and the delayed data output from circuits 403 through 406 are sequentially fed into serial-to-parallel converters 407 through 411 in synchronism with the sampling clock signal, and he data of four pixel samples are latched by the output signal of ¼ frequency divider 412. Upon input of the data of the next pixel sample, each of circuits 407 through 411 outputs the data of five pixel samples in parallel. Accordingly, at one timing instant, the twenty-five pixel samples with reference numerals a1 through e5 shown in FIG. 1 are outputted respectively from the serial-to-parallel converters 407 through 411. For instance, the data of the four pixel samples a1, b1, c1 and d1 from the line delay circuit 406 re latched in the serial-to-parallel converter 411, and the data of a total of five pixel samples, including the next pixel sample e1, emerge simultaneously from serial-to-parallel converter 411.

Of all twenty-five of the signals output from the serial-to-parallel converters 407 through 411, samples a5, b5, c5, d5, and e5, and e1, e2, e3 and e4 include peripheral reference pixel data used for interpolation, and the remaining sixteen pixels (the signals emerging from circuits 407 through 411 other than such peripheral reference pixels) are subjects to be interpolated. The interpolation circuits 413 through 431 are structurally identical. FIG. 6 specifically shows the constitution of the interpolation circuit 413 as an example.

Interpolation circuit 413 has input terminals 413a, 413b, 413c and an output terminal 413d. Input terminal 413a is supplied with the data (including one-bit control data) for one subject pixel, e.g. c5, to be interpolated, while the input terminals 413b and 413c are supplied with the data of the peripheral reference pixel samples e5 and a5 required for interpolation. The pixel data from the input terminals 413b and 413c are fed to the averaging circuit 413e, which then produces an output signal for the average value interpolation. The pixel sample data from input terminal 413a and the output signal of averaging circuit 413e are fed to a selector 413f.

Selector 413f is controlled by the one-bit control data included in the pixel data from input terminal 413a and, when the control data is "1" representative of thinning out, selector 413f selects the output of averaging circuit 413e. When the control data is "0" representative of transmission, selector 413f selects the pixel sample data from the input terminal 413a. The output signal of selector 413f is obtained at the output terminal 413d.

In case the subject pixel samples are to be thinned out, the interpolation values obtained respectively from the interpolation circuits 413 through 431 are as follows:
Interpolation circuit 413: $c5 \rightarrow \frac{1}{2}(a5+e5)$
Interpolation circuit 414: $e4 \rightarrow \frac{1}{2}(e3+e5)$
Interpolation circuit 415: $c4 \rightarrow \frac{1}{2}(c3+c5)$
Interpolation circuit 416: $a4 \rightarrow \frac{1}{2}(a3+a5)$
Interpolation circuit 417: $d4 \rightarrow \frac{1}{2}(c4+e4)$
Interpolation circuit 418: $b4 \rightarrow \frac{1}{2}(a4+c4)$
Interpolation circuit 419: $e3 \rightarrow \frac{1}{2}(e1+e5)$
Interpolation circuit 420: $a3 \rightarrow \frac{1}{2}(a1+a5)$
Interpolation circuit 421: $c3 \rightarrow \frac{1}{2}(a3+e3)$
Interpolation circuit 422: $d3 \rightarrow \frac{1}{2}(c3+e3)$
Interpolation circuit 423: $b3 \rightarrow \frac{1}{2}(a3+c3)$
Interpolation circuit 424: $e2 \rightarrow \frac{1}{2}(e1+e3)$
Interpolation circuit 425: $c2 \rightarrow \frac{1}{2}(c1+c3)$
Interpolation ciccuit 426: $a2 \rightarrow \frac{1}{2}(a1+a3)$
Interpolation circuit 427: $d2 \rightarrow \frac{1}{2}(c2+e2)$
Interpolation circuit 428: $b2 \rightarrow \frac{1}{2}(a2+c2)$
Interpolation circuit 429: $c1 \rightarrow \frac{1}{2}(a1+e1)$
Interpolation circuit 430: $d1 \rightarrow \frac{1}{2}(c1+e1)$
Interpolation circuit 431: $b1 \rightarrow \frac{1}{2}(a1+c1)$.

With reference again to FIG. 5, the data of sixteen pixels included in the output signals from the interpolation circuits 413 through 431, are fed respectively to parallel-to-serial converters 432, 433, 434 and 435 at a rate of four pixels on the same line. In such parallel-to-serial converters 432 through 435, the four post-interpolation pixel data are latched respectively by the output signal from the ¼ frequency divider 412. Serial reproduced data are outputted from the parallel-to-serial converters 432 through 435 synchronously with the sampling clock signal fed from terminal 402. It is a matter of course that the pixel data shown n FIG. 5 become different at the instant the next clock signal is generated from the ¼ frequency divider 412. That is, the individual pixel data a1, a2, a3, a4 and a5 from the serial-to-parallel converters 407 through 411 are replaced with pixel data e1, e2, e3, e4 and e5 respectively.

The reproduced data from the parallel-to-serial converter 432 are fed to line delay circuit 436, whose output data are then fed to selector 437 together with the reproduced data obtained from the parallel-to-serial converter 433. Subsequently the output data of selector 437 are fed to line delay circuit 438, whose output data are fed to selector 439 together with the reproduced data from parallel-to-serial converter 434. Thereafter the output data of selector 439 are fed to line delay circuit 440, whose output data are then fed to selector 441 together with the reproduced data from the parallel-to-serial converter 435. Such line delay circuits 436, 438, 440 and the selectors 437, 439, 441 are provided for converting the sequence of the reproduced data to the same sequence executed in the television scanning, whereby the reproduced data in the television scanning sequence are obtained at output terminal 442 of selector 441.

Figure 7:
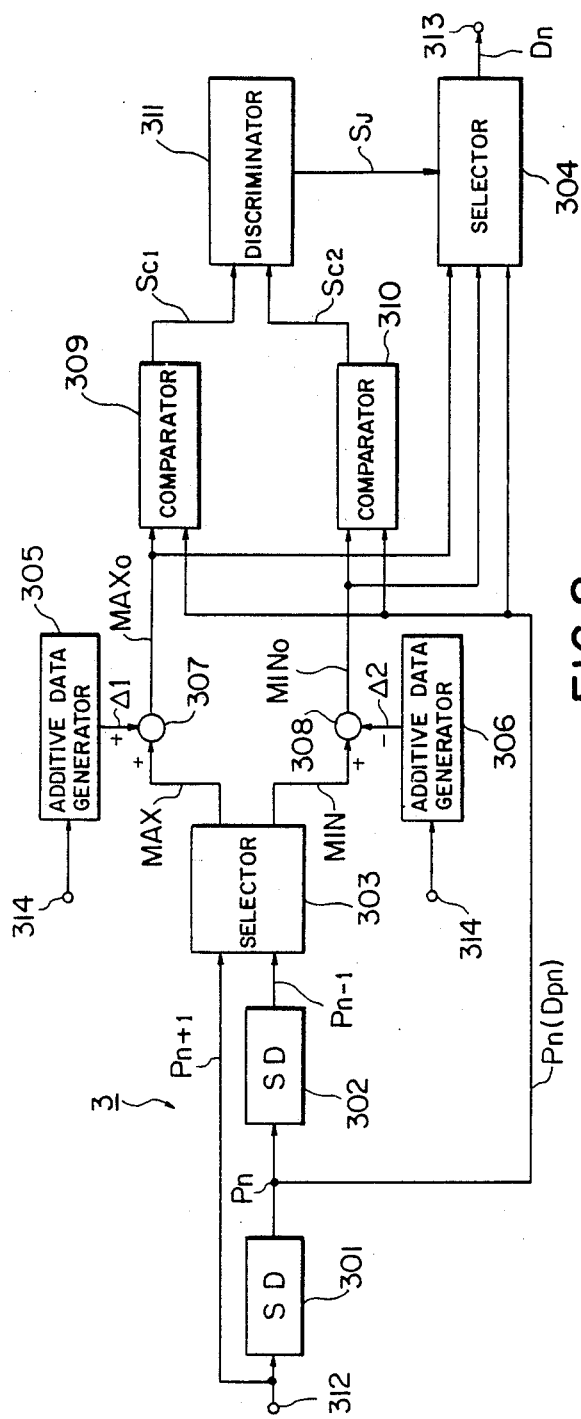
FIG. 7 is a block diagram of an exemplary nonlinear filter shown in FIG. 2.

Next, the constitution of nonlinear filter 3 will be described below with reference to FIG. 7. Nonlinear filter 3 serves for removal of noise, and principally comprises sample delay circuits 301 and 302, selectors 303 and 304, additive data generators 305 and 306, an adder 307, a subtracter 308, comparators 309 and 310, and a discriminator 311. When a wave having polar values is formed in the one-dimensional scanning line (horizontal) direction by three consecutive sampling data as illustrated in FIG. 8, the levels of the individual sampling data are compared with one another for selection, and one proper data is selectively outputted as replacement data.

The received digital video signal is fed to input terminal 312, which is connected in series to sample delay circuits 301 and 302. Each of such sample delay circuits 301 and 302 has a delay time equivalent to one sampling interval.

Figure 8:
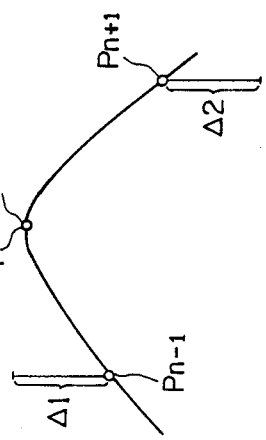
FIG. 8 is a graph schematically illustrating the operation of the nonlinear filter shown in FIG. 7.

Suppose now that, as illustrated in FIG. 8, one pixel Pn in the digital video signal is considered the subject pixel, and two pixels existing on the anterior and posterior peripheries of such subject pixel Pn are regarded here as peripheral reference pixels Pn−1 and Pn+1.

The subject pixel Pn and the peripheral reference pixels Pn−1, Pn−1 are extracted by the aforementioned sample delay circuits 301 and 302. At the timing to feed the peripheral reference pixel Pn+1 to the input terminal 312, the subject pixel Pn is obtained from sample delay circuit 301, and the peripheral reference pixel Pn−1 from sample delay circuit 302, respectively.

Selector 303 is supplied with both the input signal from input terminal 312 and the output signal of sample delay circuit 302. Selector 303 discriminates between the levels of the two input terminals, i.e. the data of the two peripheral reference pixels Pn−1 and Pn+1, and outputs the higher-level signal as a maximal value MAX to adder 307, while outputting the lower-level signal as a minimal value MIN to subtracter 308.

Additive data generator 305 is connected to adder 307 inserted between selector 303 and comparator 309, while another additive data generator 306 is connected to subtracter 308 inserted between selector 303 and comparator 310. Additive data generators 305 and 306 are provided for respectively changing the maximal value MAX and the minimal value MIN, which are outputted from the selector 303, in accordance with an offset signal fed from input terminal 314. An offset A1 generated from additive data generator 305 is added to the maximal value MAX by adder 307 to produce a maximal value MAXo (=MAX+$\Delta$1). Meanwhile an offset $\Delta$2 generated from additive data generator 306 is subtracted from the minimal value MIN by subtracter 308 to produce a minimal value MINo (=MIN−$\Delta$2). Such two offsets $\Delta$1 and $\Delta$2 are constants changed in proportion to the sampling density.

The output signal (i.e. maximal value MAXo) of adder 307 is fed to one input terminal of comparator 309 and also to the first input terminal of selector 304. The output signal (i.e. minimal value MINo) of subtracter 308 is fed to one input terminal of comparator 310 and also to the second input terminal of selector 304.

Meanwhile, the output signal (i.e. data Dpn of subject pixel Pn) of sample delay circuit 301 is fed to the other input terminals ff comparators 309, 310 and also to the third input terminal of selector 304.

In comparator 309, the pixel data selected as the maximal value MAXo out of the peripheral reference pixels Pn−1 and Pn+1 is compared with the subject pixel data Dpn outputted as a comparative value from sample delay circuit 301, and the numerical relation between the two compared data is fed as a comparison signal $Sc_1$ to discriminator 311.

In comparator 310, the pixel data selected as the minimal value MINo out of the peripheral reference pixels Pn−1 and Pn+1 is compared with the subject pixel data Dpn outputted as a comparative value from sample delay circuit 301, and the numerical relation between the two compared data is fed as a comparison signal $Sc_2$ to discriminator 311. Since the maximal value MAXo and the minimal value MINo include the offsets $\Delta$1 and $\Delta$2 added thereto respectively, it follows that the subject pixel data Dpn is weighted in comparators 309 and 310.

On the basis of such comparison signals $Sc_1$ and $Sc_2$, discriminator 311 decides the overall numerical relation among the maximal value MAXo, the minimal value MINo and the subject pixel data Dpn, and produces a two-bit decision signal SJ for selecting the value of the intermediate level (hereinafter referred to as intermediate value).

In selection of such intermediate value, it is necessary to take into consideration the presence or absence of any noise that may be superimposed on the subject pixel data Dpn.

For instance, when the subject pixel Pn is free from the harmful influence of impulsive noise, it is highly probable that the data level of the subject pixel Pn is within a range between the maximal value MAXo and the minimal value MINo. On the contrary, if any significant noise is superimposed on the subject pixel Pn, there is a high probability that the data level thereof is out of the rang between the maximal value MAXo and the minimal value MINo.

In case the data level of the subject pixel Pn is within the range between the maximal value MAXo and the minimal value MINo, harmful influence of the noise is considered to be negligible and therefore the subject pixel data Dpn is outputted as it is. However, if the subject pixel data Dpn is outside the range between maximal value MAXo and minimal value MINo, it is assumed that significant noise is superimposed thereon, so that the subject pixel data Dpn needs to be replaced with other data.

In this case, considering the gaussian distribution characteristics of the noise, it is appropriate that when the subject pixel data Dpn exceeds the maximal value MAXo, the data Dpn is replaced with the maximal value MAXo; and when the subject pixel data Dpn is less than the minimal value MINo, the data Dpn is replaced with the minimal value MINo.

The comparison signals $Sc_1$ and $Sc_2$ outputted from comparators 309 and 310 respectively are as follows:

(a) If subject pixel data Dpn > maximal value MAXo, the comparison signals become $Sc_1$="1" and $Sc_2$="1" to consequently form a decision signal SJ (=01) for selection of the maximal value MAXo;

(b) If maximal value MAXo $\geq$ subject pixel data Dpn $\geq$ minimal value MINo, the comparison signals become $Sc_1$="0" and $Sc_2$="1" to consequently form a decision signal SJ (=11) for selection of the subject pixel Dpn;

(c) If minimal value MINo > subject pixel data Dpn, the comparison signals become $Sc_1$="0" and $Sc_2$="0" to consequently form a decision signal SJ (=10) for selection of the minimal value MINo.

Accordingly, selector 304 is controlled by the above-mentioned decision signal SJ, and the intermediate values of the three signals are selectively produced as replacement data Dn at output terminal 313.

Thus, the subject pixel Pn is replaced with data having an intermediate value equal to the maximal value MAXo, the subject pixel data Dpn, or the minimal value MINo. Even if significant noise is superimposed on the subject pixel Pn and the sampling density is low, the subject pixel Pn can be replaced with suitable data obtained by respectively adding the offset $\Delta$1 to the maximal value MAX, and subtracting the offset $\Delta$2 from the minimal value MIN, so that it becomes possible to remove the noise adaptively without deteriorating resolution, hence achieving high-fidelity reproduction of the original image.

In the embodiment described above, the offsets $\Delta$1 and $\Delta$2 are added to and subtracted from the maximal value MAX and the minimal value MIN respectively by means of adder 307 and subtracter 308. However, such adjustment may alternatively be executed by employing a combined adder-subtracter. Furthermore, addition (and subtraction) of the offsets may not be needed in some cases.

Although in the above embodiment the one-dimensional filter is composed in the horizontal line direction, it may alternatively be composed in the vertical direction by replacing sample delay with line delay. It is also possible to constitute such filter by a horizontal and vertical combination.

Hereinafter other embodiments of the video signal compressive encoding/decoding method and apparatus of the present invention will be described with reference to FIGS. 9 through 12.

Figure 9:
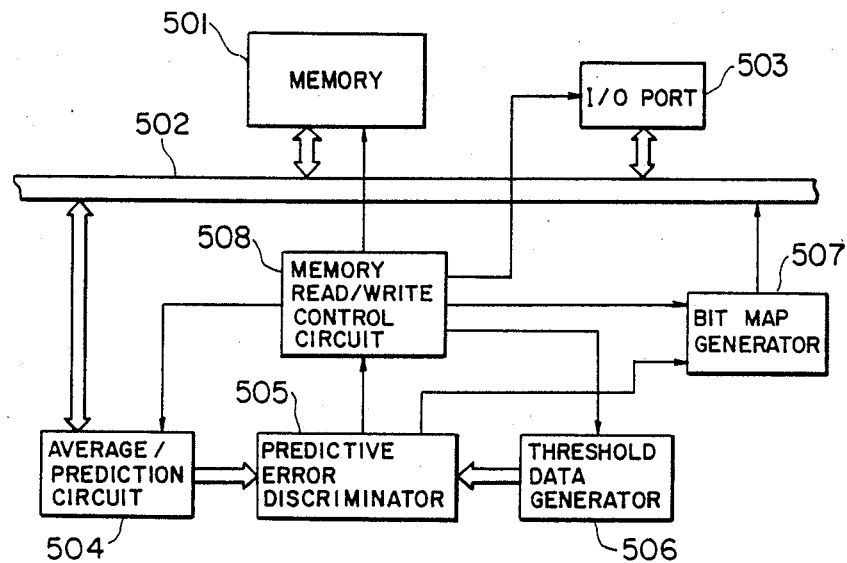
FIG. 9 is a block diagram of an exemplary subsampling encoder employed in another embodiment of the video signal compressive encoding apparatus of the invention.

FIG. 9 shows an alternative embodiment of the encoder of the invention, wherein pixel data and a bit map are stored in a memory 501. A random access memory (RAM) may be used as the memory 501. The data is transferred between a data bus 502 and an external unit via an I/O port 503. An average/prediction circuit 504 generates the average value of two selected peripheral reference pixel samples and also generates a predictive error between the average value and the value of a subject pixel sample. The predictive error obtained from circuit 504 is fed to a predictive error discriminator 505, in which a decision is made as to whether the predictive error is greater or not than the threshold value fed thereto from threshold data generator circuit 506. A bit map generator circuit 507 generates a bit map which becomes "0" or "1" depending on whether the predictive error is smaller or greater than the threshold value. The bit map thus produced is stored in memory 501 via data bus 502.

A memory R/W control circuit 508 is provided for controlling both the write and read operations. The above-described memory 501, I/O port 503, average/prediction circuit 504, threshold data generator circuit 506 and bit map generator circuit 507 are controlled by memory R/W control circuit 508.

In the FIG. 9 embodiment, when "0" is transmitted as the bit map, the value of the subject pixel sample is replaced with the average value and is therefore the data of the subject pixel sample is not transmitted. Instead, when "1" is transmitted as the bit map, the data of the subject pixel sample is transmitted. Thus, the variable density subsampling is performed in such a manner that transmission of the subject pixel sample data is determined under control in accordance with the numerical value of the predictive error.

Figure 10:
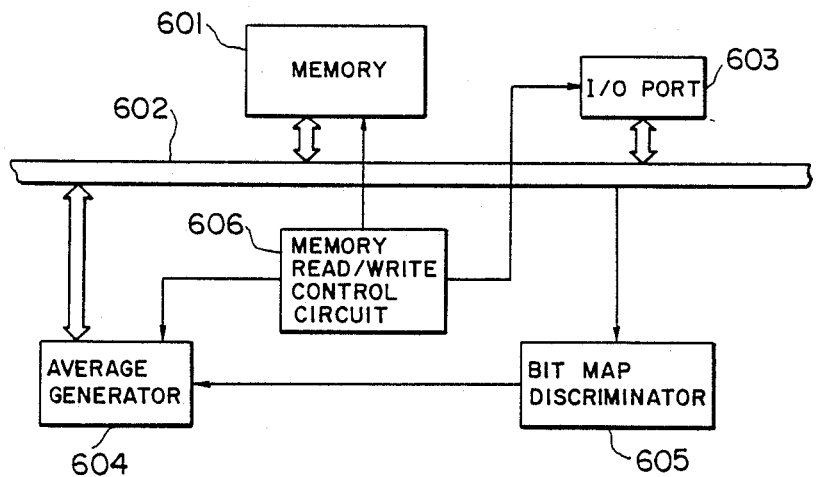
FIG. 10 is a block diagram of an exemplary subsampling decoder employed in another embodiment of the video signal compressive decoding apparatus of the invention.

FIG. 10 shows an alternative embodiment of the decoder of the invention, wherein the pixel sample data and the bit map received from I/O port 603 via data bus 602 are stored in memory 601. When the bit in the bit map is "1", the received subject pixel sample data is used directly without modification. Instead, when such bit is "0", the value of the received subject pixel sample is interpolated with an average data signal obtained from average generator circuit 604. Bit map discriminator 605 checks the bit map and makes a decision as to whether the bit corresponding to the subject pixel to be processed is "1" or "0". Memory 601, I/O port 633, and average generator circuit 604 are controlled by memory R/W control circuit 606.

Next, the operation of the encoder of the invention will be described with reference to FIGS. 11 and 12.

Figure 11:
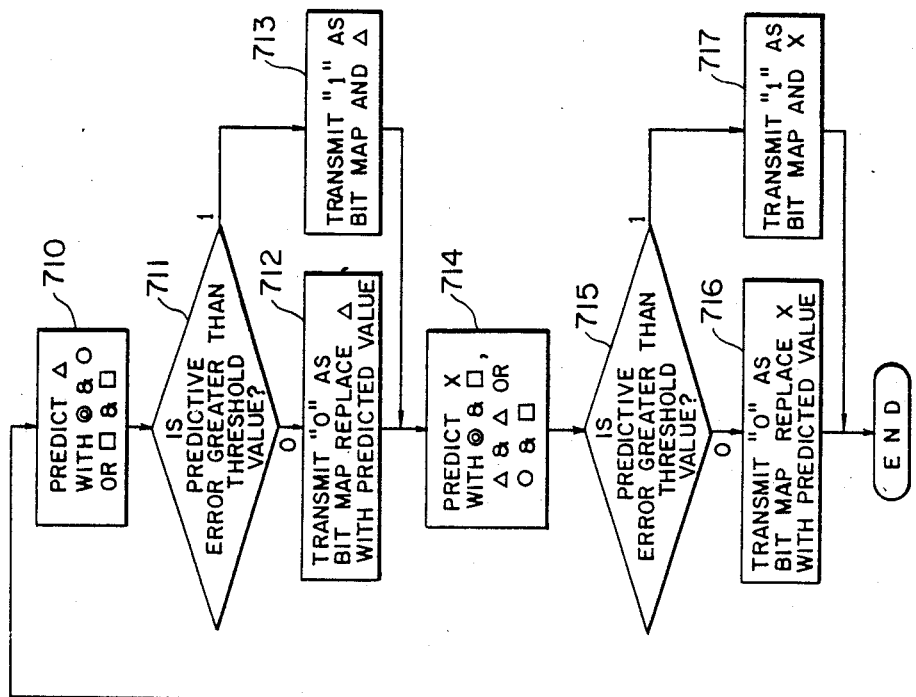
FIG. 11 is a flow chart of the video signal compressive encoding algorithm executed in the subsampling encoder of FIG. 9.
Figure 11:
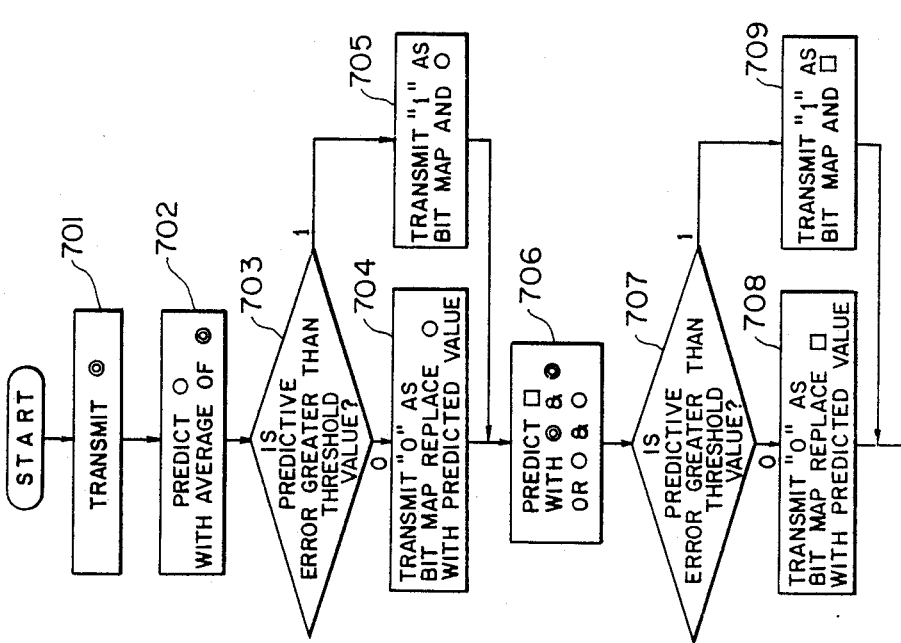
Figure 12:
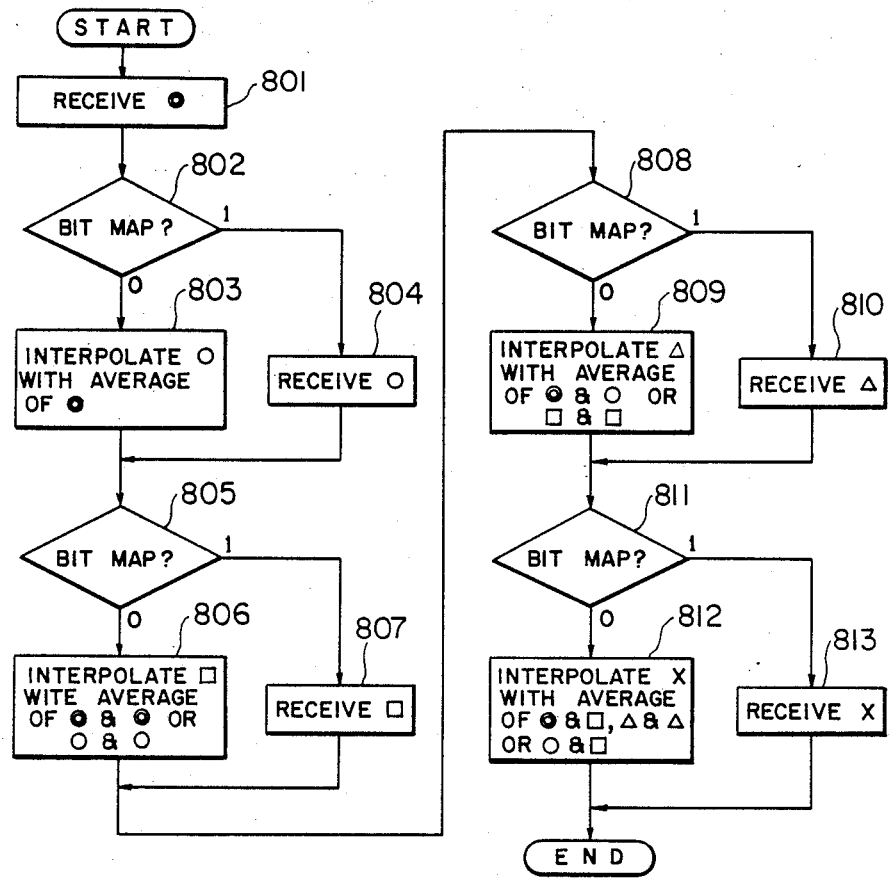
FIG. 12 is a flow chart of the decoding algorithm executed in the subsampling decoder of FIG. 10.

As shown in the flow chart of FIG. 11, first the data of the elementary pixel samples denoted by ⊙ are transmitted in their entirety (step 701). Then the data of each subject pixel o is predicted from the average value of the two upper and lower reference pixel samples spaced apart by two lines vertically from each other (step 702). The predictive error in this case is judged to be greater or smaller than the threshold value (step 703). When the predictive error is smaller than the threshold value, "0" is transmitted as the bit map, so that the original data of the subject pixel sample is replaced with the predicted value, e.g. average value, instead of being transmitted (step 704). If the predictive error exceeds the threshold value, "1" is transmitted as the bit map and therefore the original data of the subject pixel sample is transmitted (step 705).

Subsequently the data of each subject pixel sample denoted by □ is predicted from the average value of two peripheral reference pixel samples ⊙ or o spaced apart by two pixel samples horizontally from each other (step 706). Then in the next step 707, the predictive error is judged to be greater or smaller than the threshold value. When the predictive error is smaller than the threshold value, "0" is transmitted as the bit map, so that the original data of the subject pixel sample is replaced with the predicted value instead of being transmitted (step 708). If, instead, the predictive error exceeds the threshold value, "1" is transmitted as the bit map and therefore the original data of the subject pixel sample is transmitted (step 709).

Subsequently the data of each subject pixel sample Δ is predicted from the average value of two peripheral reference pixel samples ⊙—o or □—□ positioned in upper and lower lines (step 710). In the next step 711, the predictive error is judged to be greater or smaller than the threshold value. When the predictive error is smaller, "0" is transmitted as the bit map, so that the original data of the subject pixel sample is replaced with the predicted value instead ff being transmitted (step 712). If the predictive error is greater, "1" is transmitted as the bit map and therefore the original data of the subject pixel sample is transmitted (step 713).

Then the data of each subject pixel data denoted by x is predicted from the average value of two peripheral reference pixels ⊙—□, Δ—Δ, or o—□ positioned at left and right sample points (step 714). The predictive error in this case is judged to be greater or smaller than the threshold value in step 715. When the predictive error is smaller, "0" is transmitted as the bit map, so that the original data of the subject pixel sample is replaced with the average value instead of being transmitted (step 716). If the predictive error is greater, "1" is transmitted as the bit map and therefore the original data of the subject pixel sample is transmitted (step 717).

As described above, the vertical and horizontal compressions are alternately repeated and the interval is reduced by half in each compression, whereby the process is executed sequentially from rough or low-density subsampling to fine or high-density subsampling.

The operation of the decoder provided on the receiving side will now be described below with reference to the flow chart of FIG. 12. In the decoder, the data of the elementary pixel sample is initially received (step 801). Then the bit map is checked and a decision is made as to whether the bit corresponding to a subject pixel sample o is "0" or "1" (step 802). When the bit is "0", the data of the elementary pixel sample ⊙ is interpolated with the vertical average value of the data of the elementary pixel samples ⊙ (step 803). Meanwhile if the bit is "1", the received data of the subject pixel sample O is used directly (step 804).

Subsequently the bit map is checked and a decision is made as to whether the bit corresponding to a subject pixel sample □ is "0" or "1" (step 805). When the bit is "0", the data of the subject pixel sample □ is interpolated with the average value of the data of two horizontally peripheral reference pixel samples combined as ⊙—⊙ or o—o (step 806). If the bit is "1", the received data of the subject pixel sample □ is directly used (step 807).

Next the bit map is checked in step 808, and a decision is made as to whether the bit corresponding to a subject pixel sample Δ is "0" or "1". When the bit is "0", the data of the subject pixel sample Δ is interpolated with the average value of the data of two vertically peripheral reference pixel samples combined as ⊙—o, or □—□ (step 809). If the bit is "1", the received data of the subject pixel sample Δ is directly used (step 810).

In the next step 811, the bit map is checked and a decision is made as to whether the bit corresponding to a subject pixel sample x is "0" or "1". When the bit is "0", the subject pixel data x is interpolated with the average value of the data of two horizontally peripheral reference pixel samples combined as ⊙—□, Δ—Δ, or o—□ (step 812). Meanwhile if the bit is "1", the received data of the subject pixel sample x is directly used (step 813).

Comparing the second embodiment (described with reference to FIGS. 9 and 10) with the first embodiment (described with reference to FIGS. 3–6), the hardware scale become larger due to the necessity of a one field (or one frame) memory in the second embodiment, and the required processing time is rendered longer, so that the second embodiment is not best suited for still-image processing. However, since the value of each pixel sample to be thinned out is replaced with the predicted value, the invention achieves the advantage that the accumulation of the predictive errors can be reduced in the case of prediction using such pixel sample.

The stepwise encoding of the present invention realizes sequential display changeable from a rough image to a fine image without the need for data rearrangement. Furthermore, due to the repeated processing of locally convergent patterns, the invention minimizes the problem of error propagation occurring in DPCM.

The results of exemplary simulations obtained by the above-described embodiments of the present invention are listed below:

|  | Compression rate % | SN ratio (dB) |
|---|---|---|
| Flesh color chart | 24.7 | 44.0 |
| Woman with headband | 42.6 | 44.0 |
| Weather forecast | 37.1 | 45.2 |
| Swiss landscape | 62.1 | 45.7 |
| Tulip | 77.5 | 45.4 |
| Robot | 50.1 | 44.0 |

As will be understood from the results of the simulations listed above, a remarkably high signal-to-noise ratio of 44 to 45 (dB) is achieved to ensure a satisfactory quality of the reproduced image, and the compression rate is also enhanced.

In the embodiments mentioned hereinabove, the predition mode is not limited to the average value alone, and any other suitable mode may be employed as an alternative.

Besides the aforesaid examples where the pixel samples are either transmitted or thinned out, a similar effect is also attainable by, instead of thinning out the pixel samples, reducing the number of the bits thereof and transmitting merely the high-order bits alone.

Furthermore, the intervals of the elementary pixels may be changed in accordance with the image.

It is a matter of course that, in the second embodiment also, removal of noise may be executed by the use of a nonlinear filter.

What is claimed is:

1. A video signal compressive encoding method, comprising the steps of:
   (a) receiving a digital video signal represented by respective pixel samples of first predetermined bits, said pixel samples including elementary pixel samples having present values and subject pixel samples having present values;
   (b) determining respective elementary pixel samples at a predetermined rate;
   (c) predicting values of respective ones of the subject pixel samples;
   (d) detecting respective predictive errors of the predicted values from the present values of the pixel samples;
   (e) determining if each predictive error is greater than a threshold value;
   (f) generating a flag each time one of the predictive errors is determined to not exceed the threshold value; and
   (g) transmitting an encoded video signal including the elementary pixel samples, the present values of the subject pixel samples for which the respective predictive errors are greater than the threshold value, and a compressed data signal for each subject pixel sample for which the respective predictive error is less than or equal to the threshold value, each of said compressed data signals including at least one of the flags.

2. The method of claim 1, also including the steps of:
   (h) receiving the transmitted encoded video signal;
   (i) predicting a subject pixel sample value for each of said compressed data signals;
   (j) interpolating the respective subject pixels corresponding to the respective compressed data signals, with the respective subject pixel sample values predicted in step (i); and
   (k) outputting a decoded video signal including the transmitted elementary pixel samples, the respective subject pixel samples whose present values were included in the transmitted encoded video signal, and the respective subject pixel samples interpolated in step (j).

3. A video signal compressive encoding apparatus, comprising:
   (a) a means for receiving a digital video signal presented by respective pixel samples of first predetermined bits, said pixel samples including elementary pixel samples having present values and subject pixel samples having present values;
   (b) a means for determining respective elementary pixel samples at a predetermined rate;
   (c) a means for predicting values of respective ones of the subject pixel samples;
   (d) a means for detecting respective predictive errors of the predicted values from the present values of the pixel samples;
   (e) a means for determining if each predictive error is greater than a threshold value;
   (f) a means for generating a flag each time one of the predictive errors is determined not exceed the threshold value; and
   (g) a means for transmitting an encoded video signal including the elementary pixel samples, the present values of the subject pixel samples for which the respective predictive errors are greater than the threshold value, and a compressed data signal for each subject pixel sample for which the respective predictive error is less than or equal to the threshold value, each of said compressed data signals including at least one of the flags.

4. The apparatus of claim 3, also comprising:
   (h) a means for receiving the transmitted encoded video signal;
   (i) a means for predicting a subject pixel sample value for each of said compressed data signals;
   (j) a means for interpolating the respective subject pixels corresponding to the respective compressed data signals, with the respective subject pixel sample values predicted in element (i); and
   (k) a means for outputting a decoded video signal including the transmitted elementary pixel samples, the respective subject pixel samples whose present values were included in the transmitted encoded video signal, and the respective subject pixel samples interpolated in element (j).

* * * * *

UNITED STATES PATENT AND TRADEMARK OFFICE
CERTIFICATE OF CORRECTION

PATENT NO. : 4,910,594

DATED : March 20, 1990

INVENTOR(S) : Tetsujiro Kondo

It is certified that error appears in the above - identified patent and that said Letters Patent is hereby corrected as shown below:

In the Title, please correct to read as follows:

--METHOD AND APPARATUS FOR ADAPTIVELY COMPRESSING A VIDEO SIGNAL IN ACCORDANCE WITH THE VALUES OF INDIVIDUAL PIXELS--

Signed and Sealed this

Twenty-third Day of April, 1991

Attest:

HARRY F. MANBECK, JR.

*Attesting Officer*      *Commissioner of Patents and Trademarks*